C. LATTA.
PACKING RING.
APPLICATION FILED MAR. 16, 1920.
1,418,582.
Patented June 6, 1922.
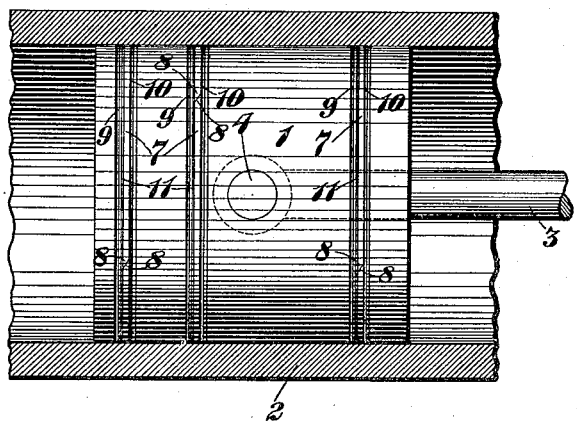
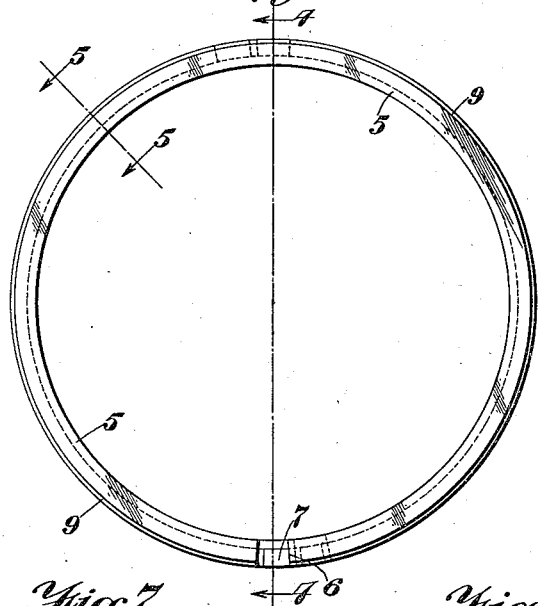
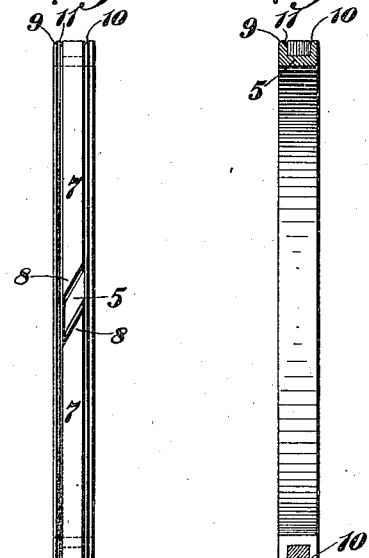
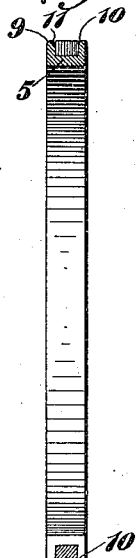
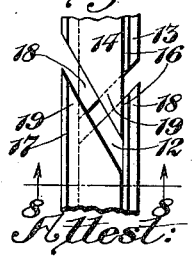
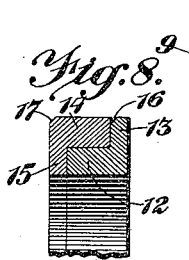
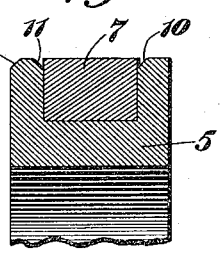
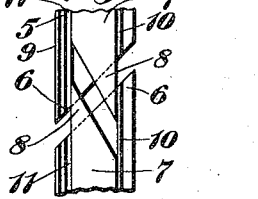
Attest:
Charles A. Becker.
G. D. McMullen
Inventor.
Charles Latta,
by Rippey & Kingsland
His Attorneys

UNITED STATES PATENT OFFICE.

CHARLES LATTA, OF ST. LOUIS, MISSOURI.

PACKING RING.

1,418,582.  Specification of Letters Patent.  Patented June 6, 1922.

Application filed March 16, 1920. Serial No. 366,723.

*To all whom it may concern:*

Be it known that I, CHARLES LATTA, a citizen of the United States, residing at the city of St. Louis and State of Missouri, have invented a new and useful Packing Ring, of which the following is a specification.

This invention relates to packing rings for reciprocating pistons.

An object of the invention is to provide an improved packing ring for reciprocating pistons comprising a resilient split packing provided with one or more circumferential oil grooves, one of said grooves being bounded on its forward side by a wall sloping toward the side edge of the packing and on the opposite side by a wall terminating in a sharp corner at the periphery of the packing operating as a cutting edge to scrape the oil from the cylinder walls into the groove during the forward stroke of the piston.

Another object of the invention is to provide an improved packing for reciprocating pistons comprising an inner ring of the open resilient type having a circumferential groove in its periphery, in combination with an outer ring of the open resilient type seated in said groove, the ends of the inner ring being formed with overlapping oblique walls and the ends of the outer ring being also formed with overlapping oblique walls transversely of the walls of the inner ring, so that when the ends of the outer ring are adjacent to the ends of the inner ring the space between the ends of each ring is intersected and crossed by a projecting portion of the other ring. By this construction I am enabled to permit the outer ring to be freely revoluble upon the inner ring, thus dispensing with the employment of lugs or pins for limiting relative rotation of the rings, since the employment of such devices essentially weakens the ring with which they are connected thereby reducing the efficiency of the packing.

Another object of the invention is to provide an improved packing comprising an inner ring and an outer ring arranged and combined preferably in the manner mentioned and in which the upper corners of the outer ring are shaped to provide circumferential grooves, passages or chambers adapted to contain a lubricant, thus providing an oil seal and positively preventing the passage of gas across the packing. In this construction it is also preferable that the upper corner of the circumferential groove in the outer ring be formed so as to provide a circumferential groove, passage or chamber adjacent to the upper wall of the outer ring.

There are other objects and advantages which will appear from the following description in which reference is made to the accompanying illustration of the preferred embodiment of the invention and in which—

Fig. 1 is a sectional view of a cylinder having a piston mounted therein and equipped with my improved packing rings.

Fig. 2 is a view looking toward the upper side edge of the packing.

Fig. 3 is a view looking toward the periphery of the packing ring.

Fig. 4 is a sectional view on the line 4—4 of Fig. 2.

Fig. 5 is a cross sectional view on the line 5—5 of Fig. 2, and enlarged with respect to the preceding views of the drawing.

Fig. 6 is a detailed view illustrating the construction and arrangement of the open ends of the two rings whereby the opening between the ends of one ring is closed by transverse portions of the other ring.

Fig. 7 is a detail view of a modified form of ring,

Fig. 8 is a cross section thereof on the line 8—8 of Fig. 7.

The piston 1 is of the usual reciprocating type arranged to operate within a cylinder 2 and is provided with a piston rod 3 for transmitting motion to the driven mechanism, said rod being pivotally connected to the piston by the usual pivot or wrist pin 4. The piston is provided with a number of circumferential grooves, each of which is adapted to receive a packing and in the present instance I have illustrated three packing rings mounted on the piston, though the number may be varied without departing from the scope of the invention.

Each packing includes an inner ring 5 of the open resilient type, the ends of which are cut obliquely to form obliquely overlapping portions 6. The ring 5 is also formed with a circumferential groove in which the outer ring 7 is mounted. The periphery of the ring 7 is in the same annular plane with the periphery of the ring 5, and the periphery of each ring is adapted and arranged to work and operate against the interior surface of the cylinder to prevent the passage or escape of gas between the piston and the cylinder. The ring 7 is also of the open resilient type and its ends are cut obliquely to form oblique overlapping portions 8, which overlap a sufficient distance to cross a space between the ends of the ring 5 and thus close the space to prevent the discharge of gas therethrough.

The oblique walls at the ends of the rings 7 are transverse of the oblique walls at the ends of the ring 5, so that the overlapping ends 8 of the ring 7 are of sufficient length to extend across and close the space between the oblique walls at the ends of the ring 5. This construction enables me to dispense with the employment of abutments in connection with either ring to limit relative rotation of the rings, and this is an important feature since the employment of abutment pins seated in holes in either ring reduces the resilient strength of the ring with a corresponding reduction in function and also increases the liability of the ring to break.

The upper corner of the ring 5 is cut away as indicated at 9, thus forming one wall of a circumferential groove, passage or chamber at the upper side of the ring, the opposite wall of which groove, passage or chamber is formed by the wall of the groove in the piston in which the packing is seated. A similar groove, passage or chamber 10 is formed at the lower side edge of the ring 7 by removing a portion of the adjacent corner of the ring 5. Another passage or chamber 11 is formed at the upper side edge of the ring 7 by removing a portion of the adjacent corner of the ring 5, as shown in Fig. 5. These several passages or chambers are adapted to receive and contain a lubricant which is retained therein when the piston is in operation, and cooperates with the piston to prevent escape of the gas between the cylinder and the piston.

The adjacent sharp corner presented by the piston above the passage or chamber 9 effectually prevents the lubricant from passing above the piston, while the sharp outer corners of the ring 7 are effective to scrape the oil from the cylinder walls and to maintain the lubricant within the passages or chambers 10 and 11 from which the lubricant is free to pass into the space between the ends of the rings, and vice versa.

The lubricant in the grooves 9, 10 and 11 excludes the accumulation of carbon and other substances in the piston and ring grooves and prevents the rings from sticking, so that they remain freely expansible and relatively revoluble. Furthermore, as the piston reciprocates, the rings 5 and 7, moving slightly from side to side in the grooves in which they are respectively seated, force the lubricant outwardly and thus maintain the piston and cylinder in a lubricated condition. The grooves 9, 10 and 11, however, retain a sufficient quantity of the lubricant to seal the grooves and prevent the passage of gas and also to lubricate the rings and prevent lodgment of carbon within the spaces.

In the modification illustrated in Figs. 7 and 8 the inner ring is substantially L-shaped in cross section having an inner portion 12 and an outwardly extending portion 13 at one edge of the inner portion. The outer ring is also substantially L-shaped in cross section and includes a portion 14 which encircles the portion 12 of the inner ring and which abuts against the side wall of the outwardly extending portion 13 of the inner ring. The outer ring also has an inwardly extending portion 15 bearing against the side edge of the portion 12 of the inner ring. The upper corner of the outwardly extending portion 13 of the inner ring is cut away as indicated at 16 to provide a circumferential groove or chamber adapted to receive a lubricant while the upper corner of the outer ring portion 14 is cut away as indicated at 17 to provide another circumferential groove or chamber for the lubricating fluid.

The ring 12—13 is provided with oblique overlapping portions 18 while the outer ring 14—15 is provided with oppositely formed obliquely overlapping portions 19 which extend across the space or line of separation between the overlapping portions 18 of the inner ring, thus closing said space or line of separation and preventing the passage of gas therethrough.

A ring of this construction, dispensing with the employment of weakening lugs or pins for limiting relative rotation of the rings and provided with the circumferential passages or chambers for the lubricant seal, is very simple and efficient.

What I claim and desire to secure by Letters Patent, is:—

1. A packing, comprising a ring adapted to seat within the groove of a piston and having the inner portion of one of the side walls thereof at right angles to the axis of the ring and the outer portion of said side wall beveled to form an oblique wall portion which joins the said inner portion inwardly from the periphery of the piston whereby a circumferential groove is formed between the ring and the wall of the groove in which it is seated, said ring also being provided with a circumferential groove having the inner portions of the side walls thereof at right angles to the axis of the ring and the outer portions of both of said side walls beveled; an additional ring seated in said groove and having its periphery in the same plane with the periphery of the first-named ring and having the side walls thereof throughout their width at right angles to the axis of said additional ring whereby circumferential grooves are formed between the opposite sides of said additional ring and the adjacent beveled walls of the first-named ring, said two rings being free to revolve relative to each other and having their ends formed at opposite oblique angles.

2. The combination with a piston having a circumferential groove whose side walls are at right angles to the axis of the piston; of a ring revolubly seated in said groove and having the inner portion of one side wall thereof at right angles to the axis of the ring and piston and the outer portion of said side wall beveled to form an oblique wall portion which joins the said inner portion inwardly from the periphery of the piston, whereby a circumferential groove is formed between the outer portion of the ring and the wall of the groove in which it is seated, said ring also being provided with a circumferential groove having the inner portions of the side walls thereof at right angles to the axis of the ring and the outer portions of said side walls beveled; an additional ring revolubly seated in said last-named groove and having its periphery in the same plane with the periphery of the first-named ring and having its side walls at right angles to the axis of the additional ring, whereby circumferential grooves are formed between the outer portion of said additional ring and the adjacent walls of the groove in which it is seated, and the ends of said two rings being formed at opposite oblique angles.

3. A packing, comprising an inner ring provided with a circumferential groove having inner portions of the side walls thereof at right angles to the axis of the ring, and the outer portions of both of said side walls beveled; an additional ring seated in said groove and having the side walls thereof throughout their width at right angles to the axis of said additional ring, whereby circumferential grooves are formed between the opposite sides of said additional ring and the adjacent beveled walls of the first-named ring.

4. A packing, comprising an inner ring provided with a circumferential groove having inner portions of the side walls thereof at right angles to the axis of the ring, and the outer portions of both of said side walls beveled; an additional ring seated in said groove and having the side walls thereof throughout their width at right angles to the axis of said additional ring, whereby circumferential grooves are formed between the opposite sides of said additional ring and the adjacent beveled walls of the first-named ring, said two rings being free to revolve relative to each other and having their ends formed at opposite oblique angles.

5. A packing, comprising a ring adapted to seat within the groove of a piston and having a circumferential portion adapted to press against the wall of the cylinder, the sidewall of said ring at which said portion is located having its inner portion at right angles to the axis of the ring, and the outer portion of said sidewall beveled to form an oblique wall portion which joins the said inner portion inwardly from the periphery of the piston, whereby a circumferential groove is formed between the ring and the wall of the groove in which it is seated; an additional ring encircling said first-named ring at the side of the circumferential portion of said first-named ring which presses against the cylinder wall, one of the side walls of said additional ring throughout the width thereof being at right angles to the axis of said additional ring, and a circumferential oil groove being formed between the circumferential portion of said first-named ring and said additional ring.

6. A spring packing for engine pistons, comprising a resilient imperforate split ring the width of which is the full width of the packing; and means forming a peripheral plane surface to contact with the cylinder walls between the forward and rear sides of the split and to close communication between the forward and rear sides of the split at the periphery of the ring; the packing also having a circumferential oil groove bounded on its forward side by a wall sloping toward the forward edge of the packing, and on the opposite side by a wall terminating in a sharp corner at the periphery of the packing, operating as a cutting edge to scrape the oil from the cylinder wall into the groove during the forward stroke of the piston; said means that forms the peripheral plane surface aforesaid confining the oil in the groove and restricting the passage of the oil across the packing to the rear side edge of the packing at the periphery thereof during the forward stroke of the piston.

7. A packing, comprising a resilient, imperforate, split packing ring having a circumferential oil groove, the forward wall of which slopes toward the side edge of the ring and the rear wall of which terminates in a sharp corner at the periphery of the ring, operating to scrape the oil from the cylinder walls during the forward stroke of the piston, and said ring being provided with a second circumferential oil groove scraped from, and rearward of the first-named oil groove, said second oil groove being bounded on one side by a wall sloping toward the rear edge of the ring and on the opposite side by a wall terminating in a sharp corner at the periphery of the ring, the corner of said last-named wall of the second oil groove operating to scrape the oil from the cylinder walls during the rearward stroke of the piston.

8. A packing, comprising a resilient imperforate split ring, and a second resilient imperforate split ring encircling a part of the first one, said packing being provided with a circumferential oil groove which is wholly out of communication with the inner circumference of the first-named ring between the ends of said groove, and which is bounded on one side by a wall sloping toward the side edge of the packing, and on the opposite side by a wall terminating in a sharp corner at the periphery of the packing operating as a cutting edge to scrape the oil from the cylinder walls into the groove during movement of the piston.

9. A spring packing for engine pistons, comprising a resilient, split ring having its ends overlapping and bounded by oblique walls, forming an oblique space between the ends of the packing; said ring also having a circumferential oil groove, bounded on its forward side by a wall sloping toward the forward edge of the packing, and on the opposite side by a wall terminating in a sharp corner at the periphery of the packing, operating as a cutting edge to scrape the oil from the cylinder wall into the groove during the forward stroke of the piston; said groove intersecting said oblique walls and opening into said oblique space between the ends of said ring, whereby small quantities of the oil are permitted to pass through said oblique space to the rear side edge of the packing.

CHARLES LATTA.